(12) United States Patent
Ichikawa

(10) Patent No.: US 11,212,458 B2
(45) Date of Patent: Dec. 28, 2021

(54) DISPLAY CONTROL APPARATUS, DISPLAY CONTROL METHOD, AND STORAGE MEDIUM

(71) Applicant: CANON KABUSHIKI KAISHA, Tokyo (JP)

(72) Inventor: Sho Ichikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/227,149

(22) Filed: Apr. 9, 2021

(65) Prior Publication Data
US 2021/0329158 A1 Oct. 21, 2021

(30) Foreign Application Priority Data
Apr. 15, 2020 (JP) .............................. JP2020-072922

(51) Int. Cl.
*H04N 5/235* (2006.01)
*H04N 5/232* (2006.01)

(52) U.S. Cl.
CPC ......... *H04N 5/2355* (2013.01); *H04N 5/2352* (2013.01); *H04N 5/232935* (2018.08)

(58) Field of Classification Search
CPC ............... H04N 5/2355; H04N 5/2352; H04N 5/232935
See application file for complete search history.

(56) References Cited

U.S. PATENT DOCUMENTS

| | | | | |
|---|---|---|---|---|
| 9,712,781 | B2* | 7/2017 | Oh | ......................... H04N 21/21 |
| 10,237,525 | B2* | 3/2019 | Kanda | .................... H04N 5/202 |
| 10,679,569 | B2* | 6/2020 | Han | ..................... G09G 3/3607 |
| 2018/0048845 | A1* | 2/2018 | Kozuka | .................. H04N 9/646 |
| 2018/0061026 | A1* | 3/2018 | Kozuka | ............... H04N 21/435 |
| 2018/0330674 | A1* | 11/2018 | Baar | ...................... H05B 45/20 |
| 2019/0246087 | A1* | 8/2019 | Uesaka | ............... H04N 5/2355 |
| 2020/0035198 | A1* | 1/2020 | Kouno | ................ H04N 7/0125 |
| 2020/0314379 | A1* | 10/2020 | Aoyama | ........... H04N 5/44504 |
| 2020/0336645 | A1* | 10/2020 | Fukuda | .............. H04N 1/00204 |
| 2021/0250564 | A1* | 8/2021 | Pieri | ....................... G06T 5/009 |

FOREIGN PATENT DOCUMENTS

JP     2016-213809 A     12/2016

* cited by examiner

*Primary Examiner* — Shahbaz Nazrul
(74) *Attorney, Agent, or Firm* — Canon U.S.A., Inc. IP Division

(57) ABSTRACT

A display control apparatus that controls a display of an image to a display device capable of displaying a high dynamic range image includes a determination unit and a control unit. The determination unit is configured to determine a region of interest a user is interested in. The control unit is configured to, on the basis of a relationship between a value of a maximum tone of display and a value of a maximum tone of the region of interest, control a display luminance of the display device such that, in a case where the image is displayed on the display device, a peak luminance of display of the region of interest is made equal to or greater than a peak luminance of a standard dynamic range display and equal to or less than a peak luminance of a high dynamic range display.

12 Claims, 12 Drawing Sheets

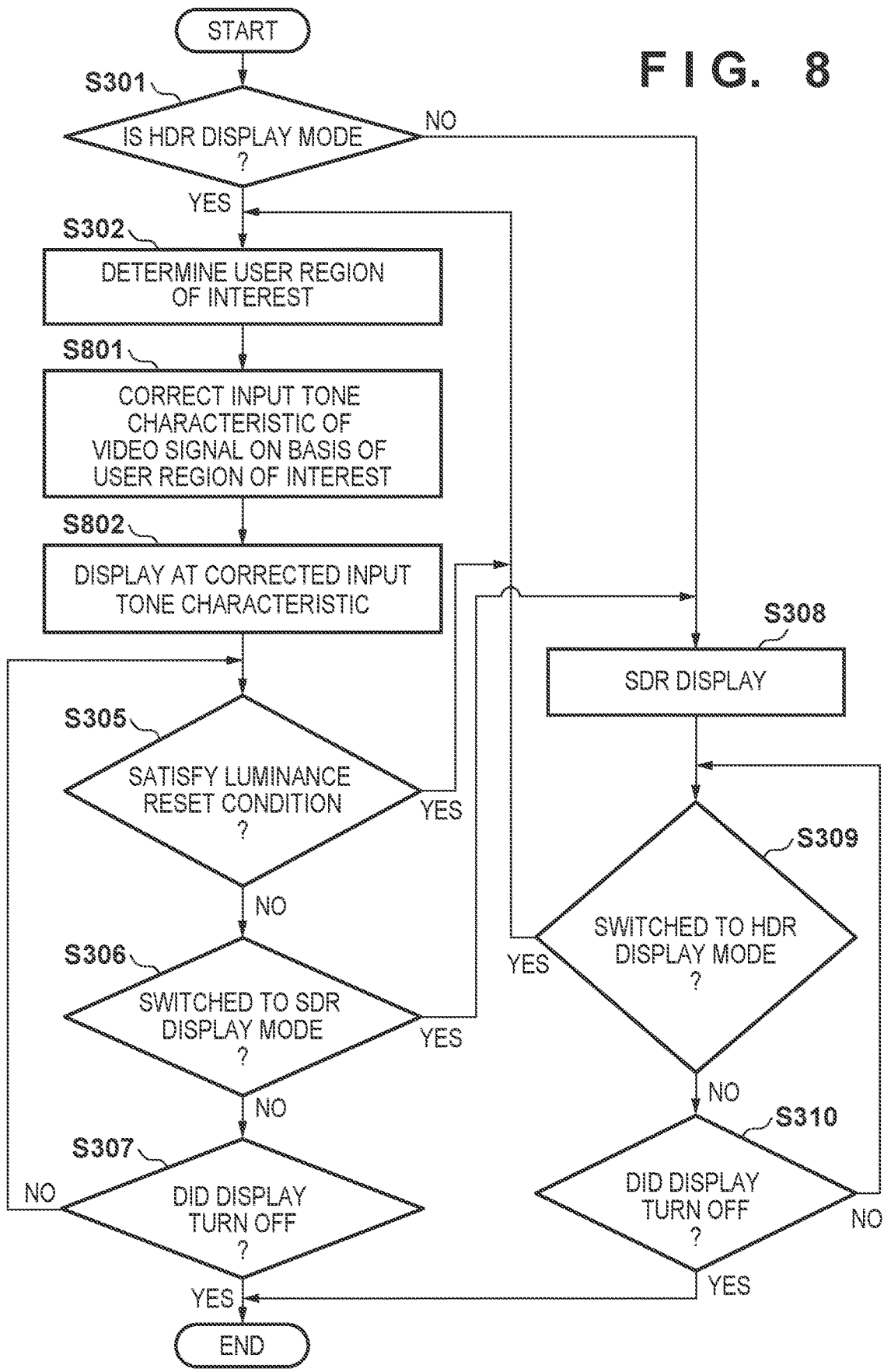

DISPLAY CONTROL APPARATUS, DISPLAY CONTROL METHOD, AND STORAGE MEDIUM

BACKGROUND

Technical Field

One disclosed aspect of the embodiments relates to display control technology in a display device capable of High Dynamic Range (HDR) display.

Description of the Related Art

In image capture devices, such as digital cameras and digital video cameras, images can be captured (image capture and recording) while the captured image is displayed on an electronic viewfinder (EVF). For example, a display panel of the image capture device or a display device (external device) connected to the image capture device is used as the EVF, and the user looks at the captured image displayed on the EVF to confirm various feature values of the captured image. The luminance value (luminance level) of the captured image is included as one of the feature values the user may wish to confirm.

In recent years, to produce a viewing experience close to that of an optical viewfinder (OVF), HDR, which has a dynamic range (luminance range) broader than the Standard Dynamic Range (SDR), is being used increasingly in image capture and display technology. Standards relating to HDR and products using HDR are also being developed. For example, the HDR10+ standard requires additional information such as the Maximum Content Light Level (MaxCLL) indicating the maximum luminance value of the scene per scene.

However, while HDR display improves image quality, the power consumption is also increased. Specifically, because the MaxCLL is determined based on the maximum tone of the scene, in a case where the region the user is looking at is not the maximum tone region, electric power is wasted by putting the luminance in a higher state than is required.

For example, in Japanese Patent Laid-Open No. 2016-213809, a device is described which converts the luminance of video on the basis of peak luminance information such as MaxCLL (Maximum Content Light Level) included in obtained video data and peak luminance of a display device.

However, in the known technology described in Japanese Patent Laid-Open No. 2016-213809, no consideration has been given to the region the user is interested in, and thus power consumption cannot be reduced.

SUMMARY

An embodiment has been made in light of the problems described above and is directed to providing a display control apparatus capable of both improving visibility of a display image and reducing power consumption.

According to a first aspect of the disclosure, a display control apparatus controls a display of an image to a display device capable of displaying a high dynamic range image. The display control apparatus includes at least one processor and at least one memory storing instructions that, when executed by the at least one processor cause the processor to function as a determination unit and a control unit. The determination unit is configured to determine a region of interest a user is interested in from an image. The control unit is configured to, on the basis of a relationship between a value of a maximum tone of display by the display device and a value of a maximum tone of the region of interest, control a display luminance of the display device such that, in a case where the image is displayed on the display device, a peak luminance of display of the region of interest is made equal to or greater than a peak luminance of a standard dynamic range display and equal to or less than a peak luminance of a high dynamic range display.

According to a second aspect of the disclosure, there is provided a display control method for controlling a display of an image to a display device capable of displaying a high dynamic range image, the method comprising: determining a region of interest a user is interested in from an image; and on the basis of a relationship between a value of a maximum tone of display by the display device and a value of a maximum tone of the region of interest, controlling a display luminance of the display device such that, in a case where the image is displayed on the display device, a peak luminance of display of the region of interest is made equal to or greater than a peak luminance of a standard dynamic range display and equal to or less than a peak luminance of a high dynamic range display.

Further features of the disclosure will become apparent from the following description of exemplary embodiments with reference to the attached drawings.

BRIEF DESCRIPTION OF THE DRAWINGS

FIG. 8 is a flowchart illustrating the operations of controlling tone characteristics of a video signal corresponding to a region of interest in a second embodiment.

DESCRIPTION OF THE EMBODIMENTS

Figure 1A:
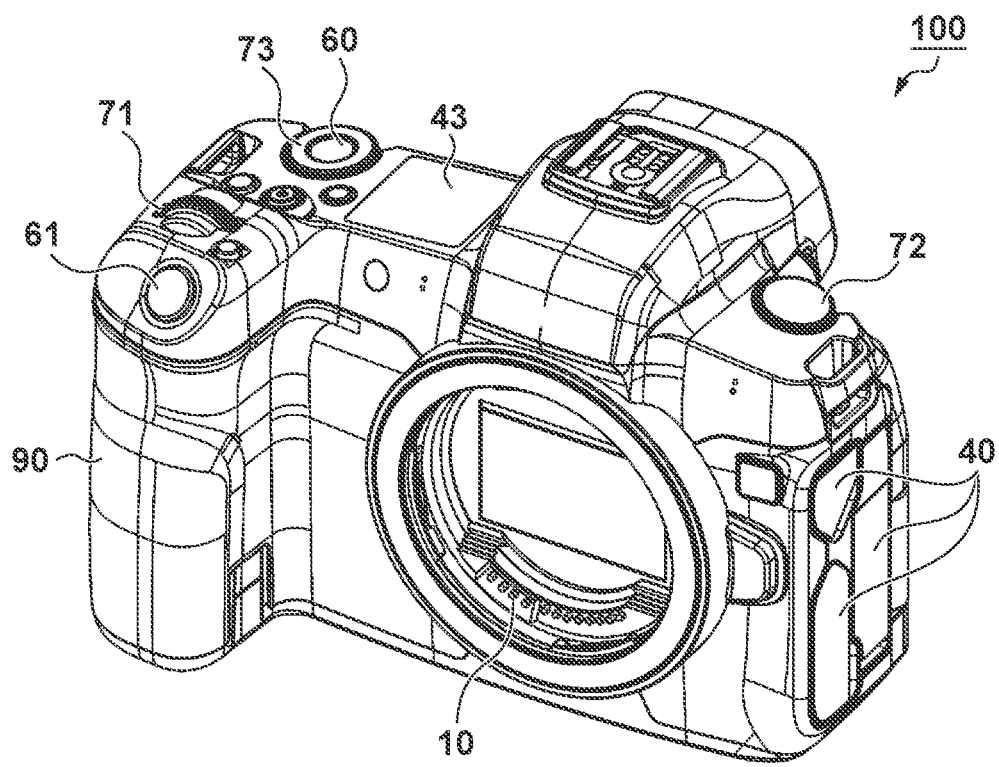
FIGS. 1A and 1B are diagrams illustrating the appearance of a digital camera according to a first embodiment.

Hereinafter, embodiments will be described in detail with reference to the attached drawings. Note, the following embodiments are not intended to limit the scope of the claimed disclosure. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

First Embodiment

Figure 1B:
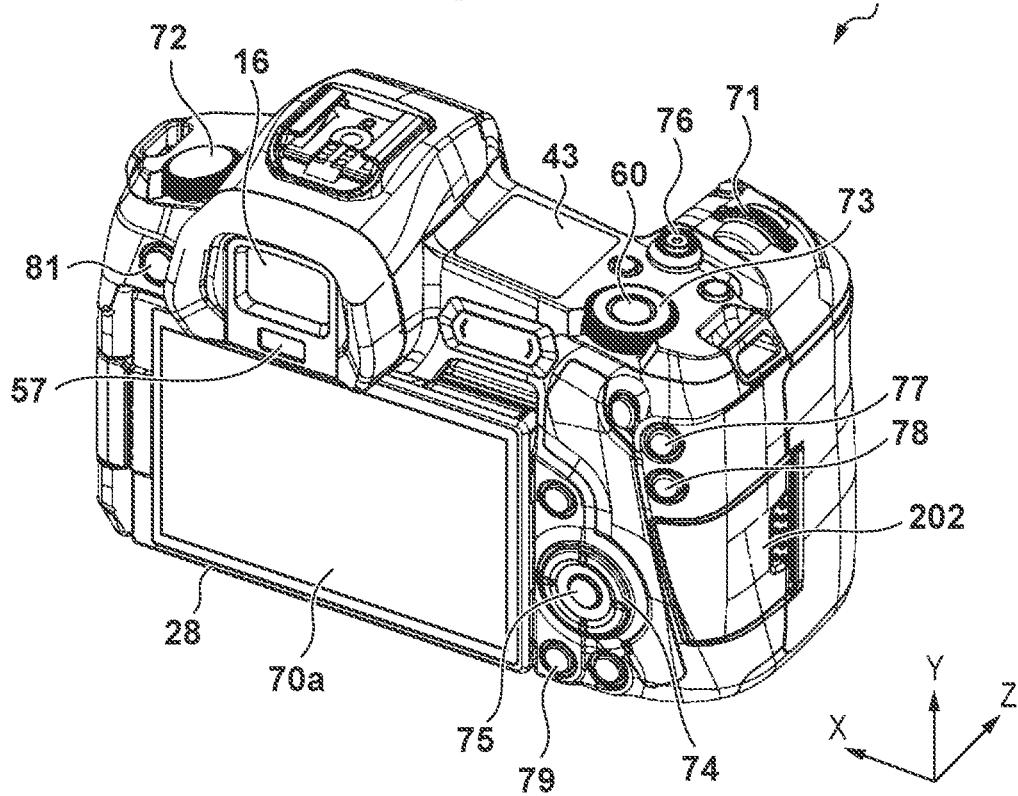

FIGS. 1A and 1B are diagrams illustrating the appearance of a digital camera 100 according to the first embodiment.

FIG. 1A is a front surface perspective view of the digital camera 100, and FIG. 1B is a back surface perspective view of the digital camera 100.

As illustrated in FIGS. 1A and 1B, a display unit 28 is a display unit that displays images and various information is provided on the camera back surface. The display unit 28 is capable of displaying high dynamic range images. A touch panel 70a can detect touch operations on the display surface (operation surface) of the display unit 28. A non-viewfinder display unit 43 is a display unit provided on a camera upper surface that displays the shutter speed, aperture, and various other setting values of the camera.

A shutter button 61 is an operation unit for performing image capturing instructions. A mode selection switch 60 is an operation unit for selecting various modes. A terminal cover 40 is a cover that protects connectors (not illustrated) for connecting the digital camera 100 to a connection cable that connects to an external device. Examples of the connector include a connection terminal (not illustrated) for a universal serial bus (USB) cable, and an output interface (I/F) 20 (see FIG. 2), which is a High Definition Multimedia Interface (HDMI) (registered trademark) output terminal.

A main electronic dial 71 is a rotational operation member provided in an operation unit 70. By rotating the main electronic dial 71, setting values, such as shutter speed and aperture, can be changed, for example. A power supply switch 72 is an operation member for switching the power of the digital camera 100 on and off. A sub-electronic dial 73 is a rotational operation member provided in the operation unit 70 that can move the selection frame and advance to images, for example.

A four-direction key 74 is a key provided in the operation unit 70 capable of being pushed on the up, down, left, and right portions. The four-direction key 74 enables operation corresponding to the pushed portion of the four-direction key 74. A SET button 75 is a push button provided in the operation unit 70 mainly used for setting the selected item. A video button 76 is used to instruction to start and stop of video capturing (recording). An auto exposure (AE) lock button 77 is provided in the operation unit 70. By pushing the AE lock button 77 in an image capturing standby state, the exposure state can be fixed.

An enlargement button 78 is an operation button provided in the operation unit 70 and is for turning on and off an enlargement mode in the live view display in the image capturing mode. By operating the main electronic dial 71 when the enlargement mode is on, the live view image can be enlarged or reduced in size. In the reproduction mode, the enlargement button 78 functions as an enlargement button to enlarge a reproduced image or to increase the magnification ratio. A reproduction button 79 is an operation button provided in the operation unit 70 for switching to the image capturing mode and the reproduction mode. When the reproduction button 79 is pushed in image capturing mode, reproduction mode is switched to, and the latest images from among the images recorded in a recording medium 200 can be displayed on the display unit 28, an EVF 29, or an external device 210.

A menu button 81 is provided in the operation unit 70. By pushing the menu button 81, a menu screen where various settings can be set is displayed on the display unit 28, the EVF 29, or the external device 210. The user uses the menu screen displayed on the display unit 28, the EVF 29, or the external device 210 and the four-direction key 74 and the SET button 75 to intuitively set the various settings. A communication terminal 10 is a communication terminal for communication between the digital camera 100 and a (detachable) lens unit 150 described below.

An eyepiece unit 16 is an eyepiece unit of an eyepiece viewfinder (peep type viewfinder). Via the eyepiece unit 16, the user can visually inspect the images displayed on the EVF 29 capable of displaying high dynamic range images therein. An eye-proximity detection unit 57 is an eyepiece detection sensor that detects whether or not the user is in close proximity to the eyepiece unit 16. A cover 202 is a cover for a slot where the recording medium 200 is housed.

A grip unit 90 is a holding unit with a shape that is easy to grip with the right hand when the user is using the digital camera 100. The shutter button 61 and the main electronic dial 71 are disposed at a position allowing for operation using the index finger of the right hand, when digital camera is held by holding the grip unit 90 with the little finger, the ring finger, and the middle finger of the right hand. Also, the sub-electronic dial 73 is disposed at a position allowing for operation by the thumb of the right hand when in the same state.

Figure 2:
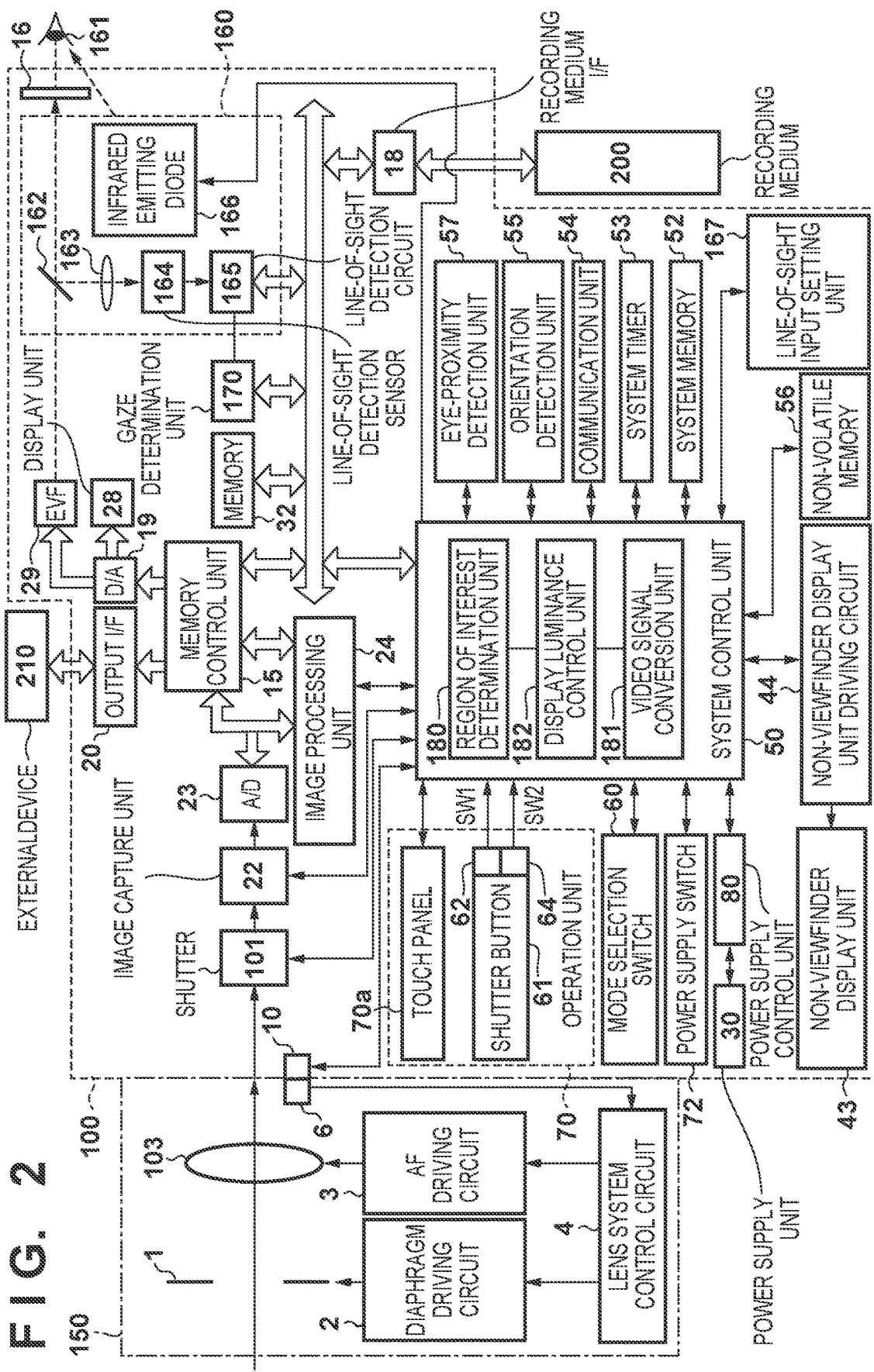
FIG. 2 is a diagram illustrating a block configuration of a digital camera.

FIG. 2 is a diagram illustrating the block configuration of the digital camera 100 of the present embodiment.

In FIG. 2, the lens unit 150 is a lens unit installed with a replaceable imaging lens. A lens 103, while typically being constituted by a plurality of lenses, is illustrated simply here as only one lens. A communication terminal 6 is a communication terminal for communication between the lens unit 150 and the digital camera 100. The lens unit 150 communicates to a system control unit 50 via the communication terminal 6 and the communication terminal 10 on the digital camera 100 side. Also, control of a diaphragm 1 is performed by an internal lens system control circuit 4 via a diaphragm driving circuit 2, and focus is performed by moving the position of the lens 103 using an auto focus (AF) driving circuit 3.

A shutter 101 is a focal plane shutter that can freely control the exposure time of an image capturing unit 22 via control by the system control unit 50. The image capturing unit 22 is provided with an image sensor constituted by a charge-coupled device (CCD), a complementary metal oxide semiconductor (CMOS) element, and the like for converting an optical image into an electrical signal. An analog-to-digital (A/D) converter 23 is used to convert an analog signal output from the image capturing unit 22 into a digital signal.

An image processing unit 24 performs a predetermined pixel interpolation, a resizing processing such as reduction, color conversion processing, and the like on data from the A/D converter 23 or from a memory control unit 15 described below. Also, the image processing unit 24 performs a predetermined calculation processing using the captured image data. The system control unit 50 performs exposure control and focus adjustment control on the basis of the calculation result obtained by the image processing unit 24. In this manner, through-the-lens (TTL) type AF processing, AE processing, pre-flash emission processing and the like are performed. The image processing unit 24 also performs a predetermined calculation processing using the captured image data and TTL type auto white balance (AWB) on the basis of the obtained calculation result.

The memory control unit 15 controls the transmission and reception of data between the A/D converter 23, the image processing unit 24, and memory 32. Output data from the A/D converter 23 is directly written on the memory 32 via the image processing unit 24 and the memory control unit 15 or via the memory control unit 15. The memory 32 stores image data of an image obtained by the image capturing unit 22 and converted into digital data by the A/D converter 23, image data for displaying on the display unit 28, the EVF 29, or the external device 210, and the like. The memory 32 is provided with enough storage capacity to store a predetermined number of still images, video and audio of a predetermined amount of time, and the like.

Also, the memory 32 also functions as memory (video memory) for image display. A digital-to-analog (D/A) converter 19 converts data for image display stored in the memory 32 into an analog signal and supplies the analog signal to the display unit 28 and the EVF 29. In this manner, the image data for display written on the memory 32 is displayed by the display unit 28 and the EVF 29 via the D/A converter 19. The display unit 28 and the EVF 29 perform display corresponding to the analog signal from the D/A converter 19 on a display, such as an liquid crystal display (LCD), an organic electro-luminescent (EL), and the like.

The output I/F 20 supplies the data for image display stored in the memory 32 as a digital signal to the external device 210. In this manner, the image data for display written on the memory 32 is displayed by the external device 210. By successively transfers and displaying the data A/D converted by the A/D converter 23 and accumulated in the memory 32 on the display unit 28, the EVF 29, or the external device 210, live view (LV) display can be performed. Hereinafter, the image displayed by live view will be referred to as the LV image.

An infrared emitting diode 166 is a light-emitting element for detecting the line-of-sight position of the user in the viewfinder screen and irradiates the eyeball (or eye) 161 of the user with infrared light. The infrared light emitting from the infrared emitting diode 166 reflects over an eyeball 161, and the reflected infrared light reaches a dichroic mirror 162. The dichroic mirror 162 reflects on the infrared light and lets the visible light through. The infrared reflected light with the changed optical path forms an image on an imaging surface of a line-of-sight detection sensor 164 via an imaging lens 163. The imaging lens 163 is an optical member that constitutes the line-of-sight detection optical system. The line-of-sight detection sensor 164 includes an imaging device such as a CCD type image sensor.

The line-of-sight detection sensor 164 photoelectrically converts the incident infrared reflected light into an electrical signal and outputs the electrical signal to a line-of-sight detection circuit 165. The line-of-sight detection circuit 165 detects the line-of-sight position of the user from the movement of the eyeball 161 of the user using the output signal of the line-of-sight detection sensor 164 and outputs the detection information to the system control unit 50 and a gaze determination unit 170. Accordingly, a line-of-sight detection unit 160 is constituted by the dichroic mirror 162, the imaging lens 163, the line-of-sight detection sensor 164, the infrared emitting diode 166, and the line-of-sight detection circuit 165, and the eyepiece unit 16 functions as a line-of-sight operation unit. The line-of-sight detection unit may have a configuration other than this.

The gaze determination unit 170 includes a predetermined threshold and in a case where, using detection information obtained from the line-of-sight detection circuit 165, it is determined that the time the user's gaze remains fixed in a region exceeds the predetermined threshold, determines that the user is gazing at the region. Note that the predetermined threshold described above may be freely changed.

The non-viewfinder display unit 43 displays the shutter speed, aperture, and various other setting values of the camera via a non-viewfinder display unit driving circuit 44.

A non-volatile memory 56 is a memory which is electrically erasable and recordable, such as Flash-read only memory (ROM), for example. Constants, programs, and the like for operation of the system control unit 50 are stored in the non-volatile memory 56. Herein, programs refer to programs for executing the various flowcharts described below in the present embodiment.

The system control unit 50 is a control unit including at least one processor or a programmable device or circuit that controls the entire digital camera 100 and at least one memory that stores programs or instructions to be executed by the at least one processor. By executing the programs or instructions recorded on, or stored in, the non-volatile memory 56 described above, the various processes of the present embodiment described below are implemented. For example, the programs or instructions, when executed by the processor, cause the processor to be configured as various functional units, or to perform operations, as described in the following. Constants and variables for operation of the system control unit 50 and programs read out from the non-volatile memory 56 are deployed on a system memory 52 such as random access memory (RAM), for example. The RAM may also be loaded, from the non-volatile memory 56 or non-transitory storage medium, with the instructions or programs that cause the processor to be configured as various functional units, or to perform operations, as described in the following. Also, the system control unit 50 controls the memory 32, the display unit 28, and the EVF 29 to perform display control. At this time, a video signal conversion unit 181 controls the tone characteristics of the video signal output to the display unit 28, the EVF 29, or the external device 210. Switching display modes between the SDR and the HDR which has a broader dynamic range (luminance range) than SDR is controlled here as well. Also, a display luminance control unit 182 controls the display luminance of the display unit 28, the EVF 29, or the external device 210. The method of controlling the display luminance is described below. A region of interest determination unit 180 determines a region of interest of the user in the display unit 28. The method of determining the region of interest is described below.

A system timer 53 is a time measuring unit that measures the time used by the various controls, the time of a built-in timer, and the like.

The mode selection switch 60, a first shutter switch 62, a second shutter switch 64, and the operation unit 70 are operation units for inputting various operation instructions to the system control unit 50. The mode selection switch 60 switches the operation mode of the system control unit 50 to any one of a still image capturing mode, a video capturing mode, or the like. Modes included in the still image capturing mode are an automatic image capturing mode, an automatic scene determination mode, a manual mode, an aperture priority mode (AV mode), a shutter speed priority mode (TV mode), and a program AE mode (P mode). Also, various types of scene modes, which include image capturing settings specific to respective image capturing scenes, and custom modes are also included. The user can directly switch to any one of the modes by using the mode selection switch 60. Alternatively, after switching to a screen listing the image capturing modes using the mode selection switch 60, a mode may be selected from the displayed plurality of modes and switched to using another operation member. In a similar manner, the video capturing mode may include a plurality of modes.

The first shutter switch 62 turns on during the operation of the shutter button 61 provided on the digital camera 100, or in other words when half pressed (capturing preparation instruction), and generates a first shutter switch signal SW1. In response to the first shutter switch signal SW1, image capture preparation operations, such as AF processing, AE processing, AWB processing, and pre-flash emission processing, are started.

The second shutter switch 64 turns on when the operation of the shutter button 61 is completed, or in other words when fully pressed (image capture instruction), and generates a second shutter switch signal SW2. In response to the second shutter switch signal SW2, the system control unit 50 starts a series of image capture processing operations from reading out a signal from the image capturing unit 22 to writing the captured image as an image file on the recording medium 200.

The operation unit 70 includes various operation members as input units for receiving operations from the user. The operation unit 70 includes at least the following operation units: the shutter button 61, the touch panel 70a, the main electronic dial 71, the power supply switch 72, the sub-electronic dial 73, the four-direction key 74, the SET button 75, the video button 76, the AE lock button 77, the enlargement button 78, the reproduction button 79, and the menu button 81.

A power supply control unit 80 includes a battery detection circuit, a direct current (DC)-DC converter, and a switch circuit for switching blocks to be energized. The power supply control unit 80 detects whether a battery is installed, the type of battery, and the remaining battery level. Also, the power supply control unit 80 controls the DC-DC converter on the basis of the detection results and an instruction from the system control unit 50 and supplies the required voltages to various components including the recording medium 200 at the required time. A power supply unit 30 includes a primary battery, such as an alkaline battery and a lithium battery, a secondary battery such as a nickel-cadmium (NiCd) battery, a nickel metal halide (NiMH) battery, and a lithium-ion (Li) battery, and/or an alternating current (AC) adapter.

A recording medium I/F 18 is an interface with the recording medium 200, such as a memory card or a hard disk. The recording medium 200 is a recording medium such as a memory card for recording capture images and is constituted by a semiconductor memory, a magnetic disk, or the like.

A communication unit 54 connects to an external device wirelessly or via a cable and transmits and receives video signals and audio signals. The communication unit 54 is also capable of connecting to a wireless local area network (LAN) and the Internet. Also, the communication unit 54 is capable of communicating with an external device via Bluetooth (registered trademark) or Bluetooth Low Energy. The communication unit 54 is capable of transmitting images (including an LV image) captured by the image capturing unit 22 and images recorded on the recording medium 200 and receiving images and various other types of information from an external device.

An orientation detection unit 55 detects the orientation of the digital camera 100 with respect to the direction of gravity. Whether an image captured by the image capturing unit 22 is an image taken by the digital camera 100 in landscape or portrait can be determined on the basis of the orientation detected by the orientation detection unit 55. The system control unit 50 can add orientation information based on the orientation detected by the orientation detection unit 55 to an image file of an image captured by the image capturing unit 22, or rotate and record the image. An acceleration sensor or a gyro sensor can be used as the orientation detection unit 55, for example. The motion of the digital camera 100 (such as a pan, tilt, lift-up, and whether the digital camera 100 is at rest) can also be detected by using the acceleration sensor or gyro sensor constituting the orientation detection unit 55.

The eye-proximity detection unit 57 is an eye-proximity detection sensor that detects movement of the eyeball (or eye) 161 toward (eye proximity) and away (eye separation) from the eyepiece unit 16 of the viewfinder. The system control unit 50 switches between display (display state) and non-display (non-display state) of the display unit 28 and the EVF 29 according to the state detected by the eye-proximity detection unit 57. More specifically, in a case where at least the image capturing standby state in active and display destination switching is set to automatic, when the eye is not close, the display destination is set as the display unit 28 and display is turned on and the EVF 29 is set to non-display. Also, when the eye is close, the display destination is set to the EVF 29 and display is turned on and the display unit 28 is set to non-display. The eye-proximity detection unit 57 can use an infrared proximity sensor, for example, to detect the approach of an object toward the eyepiece unit 16 of the viewfinder built-in the EVF 29. When an object is in close proximity, infrared light from a light projecting unit (not illustrated) of the eye-proximity detection unit 57 reflect and are received by a light receiving unit of the infrared proximity sensor. Using the amount of received infrared light, how close the object is to the eyepiece unit 16 (eye proximity distance) can be determined. In this manner, the eye-proximity detection unit 57 detects eye proximity by detecting the proximity distance of the object to the eyepiece unit 16.

In a case of an object approaching within a predetermined distance to the eyepiece unit 16 from in a non-eye approach state (non-proximity state) being detected, it is determined that the eye proximity has been detected. In a case of an object detected as approaching is detected to have moved away a predetermined distance or greater, it is determined that eye separation has been detected. The threshold for detecting eye proximity and the threshold for detecting eye separation may be made different by providing a hysteresis, for example. From when eye proximity is detected until eye separation is detected is determined as an eye proximity state. From when eye separation is detected until eye proximity is detected is determined as a non-eye proximity state. Note that the infrared proximity sensor is an example, and another sensor capable of detecting the approach of an eye or object considered for eye proximity may be employed as the eye-proximity detection unit 57.

A line-of-sight input setting unit 167 sets to enable or disable line of sight detection by the line-of-sight detection circuit 165. Alternatively, the line-of-sight input setting unit 167 sets to enable or disable processing by the system control unit 50 using the line-of-sight input. For example, this can be set by the user using menu settings. The system control unit 50 can detect the following operations and states with respect to the eyepiece unit 16.

A line-of-sight that has not been input to the eyepiece unit 16 being newly input to the eyepiece unit 16. In other words, the start of line-of-sight input.

A state of inputting a line-of-sight to the eyepiece unit 16.

A state of gazing into the eyepiece unit 16.

The line-of-sight input to the eyepiece unit 16 being removed. In other words, the end of line-of-sight input.

A state of inputting no line-of-sight to the eyepiece unit 16.

The operations and states and position the line-of-sight is input on the eyepiece unit 16 are reported to the system control unit 50 via an internal bus, and the system control unit 50 determines what operation (line-of-sight operation) has been performed on the eyepiece unit 16 on the basis of the reported information.

The touch panel 70a and the display unit 28 can be integrally formed. For example, the touch panel 70a is configured to have light transmittance that does not obstruct the display of the display unit 28 and is attached to the upper layer of the display surface of the display unit 28. Also, the input coordinates in the touch panel 70a are associated with the display coordinates on the display screen of the display unit 28. In this manner, a graphical user interface (GUI) can be provided that enables a screen displayed on the display unit 28 to be directly operated by a user. The system control unit 50 can detect the following operations and states with respect to the touch panel 70a.

A finger or stylus pen that has not touched the touch panel 70a newly touching the touch panel 70a. In other words, touch start (referred to as touch-down below).

A state of the finger or stylus pen touching the touch panel 70a (referred to as touch-on below).

A state of the finger or stylus pen moving while touching the touch panel 70a (referred to as touch-move below).

The finger or stylus pen touching the touch panel 70a being separated. In other words, touch end (referred to as touch-up below).

A state of nothing touching the touch panel 70a (referred to as touch-off below).

When touch-down is detected, touch-on may also be simultaneously detected. After, touch-down, for as long as touch-up is not detected, touch-on is typically continuously detected. Touch-move is also detected while touch-on is being detected. Even, if touch-on is being detected, unless the touch position is moving, touch-move is not detected. Touch-off correlates to after the detection of touch-up of all of the fingers and stylus pen that were touching.

The operations and states and positional coordinates where the finger or stylus pen are touching the touch panel 70a are reported to the system control unit 50 via an internal bus, and the system control unit 50 determines what operation (touch operation) has been performed on the touch panel 70a on the basis of the reported information. Regarding touch-move, the movement direction of the finger or stylus pen moving on the touch panel 70a can be determined for each vertical component and horizontal component on the touch panel 70a on the basis of changes in the positional coordinates. In a case where a touch-move of a predetermined distance or greater is detected, it is determined that a slide operation has been performed. An operation where a finger, while touching the touch panel, is quickly moved a certain distance and then released is referred to as a "flick". In other words, a flick is an operation of quickly drawing a finger across the touch panel 70a then releasing. In a case where a touch-move of a predetermined distance or greater at a predetermined speed or greater is detected and then touch-up is detected, a flick may be determined to have been performed (it can be determined that a flick was performed after a slide operation). Furthermore, a touch operation of touching a plurality of points (e.g. two points) simultaneously and moving these touch positions closer together is referred to as "pinch-in", and a touch operation of moving these touch positions further apart is referred to as "pinch-out". Pinch-out and pinch-in are collectively referred to a pinch operation (or simply "pinch"). For the touch panel 70a, various types of touch panels may be used, such as a resistive film type, an electrostatic capacitance type, a surface acoustic wave type, an infrared type, an electromagnetic induction type, an image recognition type, and an optical sensor type. Depending on the method, a touch is detected in a case where the touch panel is touched, or a touch is detected in a case where a finger or stylus pen approaches the touch panel, but either way may be employed.

Next, a method of controlling the peak luminance of the display corresponding to the region of interest according to the first embodiment will be described with reference to FIGS. 3 to 7D.

Figure 3:
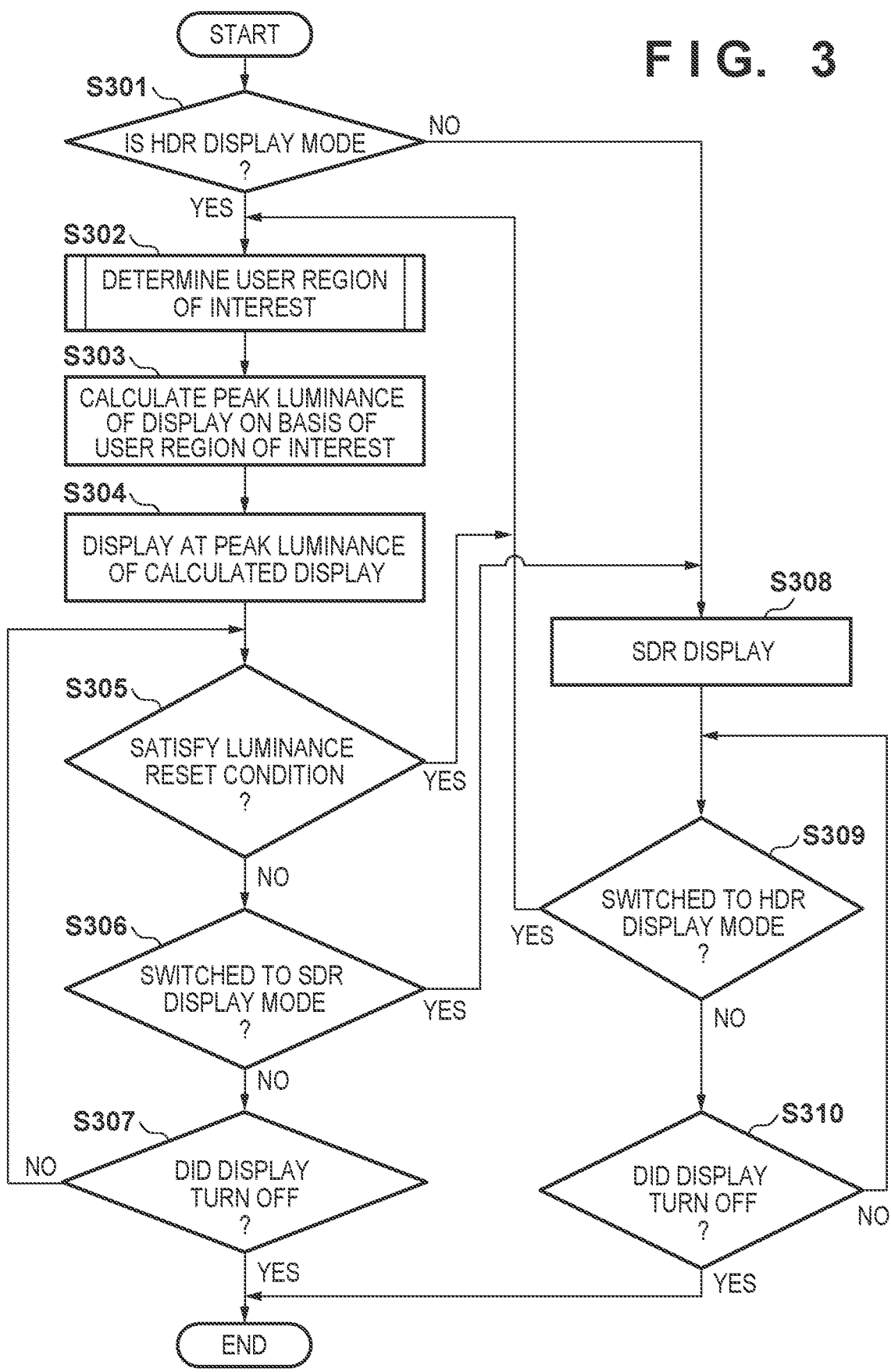
FIG. 3 is a flowchart illustrating the operations of controlling a peak luminance of a display corresponding to a region of interest in the first embodiment.

FIG. 3 is a flowchart illustrating the operations of controlling the peak luminance of the display corresponding to the region of interest in the first embodiment. Each process of the flowchart of FIG. 3 is implemented by the system control unit 50 deploying a program stored in the non-volatile memory 56 on the system memory 52, executing the program, and controlling the functional blocks. The flowchart of FIG. 3 starts with the digital camera 100 being activated.

When the digital camera 100 is activated, in step S301, the system control unit 50 determines whether or not HDR display mode is active. In a case where HDR display mode is active, the process proceeds to step S302. In a case where HDR display mode is not active, the process proceeds to step S308.

In step S302, the system control unit 50 determines a region of interest 604. Then the process proceeds to step S303. The method of determining the region of interest 604 will be described below using FIGS. 5 and 6.

In step S303, the system control unit 50 calculates a peak luminance La (cd/m$^2$) of the display on the basis of the determined region of interest 604. This is calculated as indicated below in equation (1), for example, using a maximum tone Tmax of the display, a peak luminance Lh (cd/m$^2$) of HDR display time, a peak luminance Ls (cd/m$^2$) of SDR display time, and a maximum tone Ta of the region of interest 604.

$$La = \{Ta(Lh-Ls)/T\max\} + Ls \quad (1)$$

In other words, the peak luminance La of the display of the region of interest 604 is controlled to be a value equal to or greater than the peak luminance of SDR display time and equal to or less than the peak luminance of high dynamic range display time, on the basis of the ratio (relationship) to the maximum tone Ta of the region of interest 604 to the maximum tone Tmax of the display. Note that, a fraction after the decimal point is rounded off. Specifically, if Tmax=255, Lh=1000, Ls=200, and Ta=204, then La=840. In this manner, the peak luminance La (cd/m$^2$) of the display is calculated based on the region of interest 604, and the process then proceeds to step S304.

In step S304, the system control unit 50 executes display at the peak luminance La (cd/m$^2$) of the display based on the calculated region of interest 604, and the process proceeds to step S305. For example, the luminance setting of the display unit 28, the EVF 29, or the external device 210 is changed and implemented. The characteristics of the image data may also be changed.

In step S305, the system control unit 50 determines whether or not a luminance reset condition is satisfied. For example, in a case such as that illustrated in FIGS. 7A to 7D where the composition is switched or in a case where a luminance reset operation is performed using the operation unit 70, it is determined that the luminance reset condition is satisfied. In a case where the luminance reset condition is satisfied, the process returns to step S302. In a case where the luminance reset condition is not satisfied, the process proceeds to step S306. FIGS. 7A to 7D will be described in detail below.

In step S306, the system control unit 50 determines whether or not SDR display mode has been switched to. In a case where SDR display mode has been switched to, the process proceeds to step S308. In a case where SDR display mode has not been switched to, the process proceeds to step S307.

In step S307, the system control unit 50 determines whether or not the display has been turned off. In a case where the display has been turned off, the flow ends. In a case where the display has not been turned off, the process returns to step S305.

In step S308, the system control unit 50 performs SDR display, and then the process proceeds to step S309.

In step S309, the system control unit 50 determines whether or not HDR display mode has been switched to. In a case where HDR display mode has been switched to, the process returns to step S302. In a case where HDR display mode has not been switched to, the process proceeds to step S310.

In step S310, the system control unit 50 determines whether or not the display has been turned off. In a case where the display has been turned off, the flow ends. In a case where the display has not been turned off, the process returns to step S309.

Figure 4:
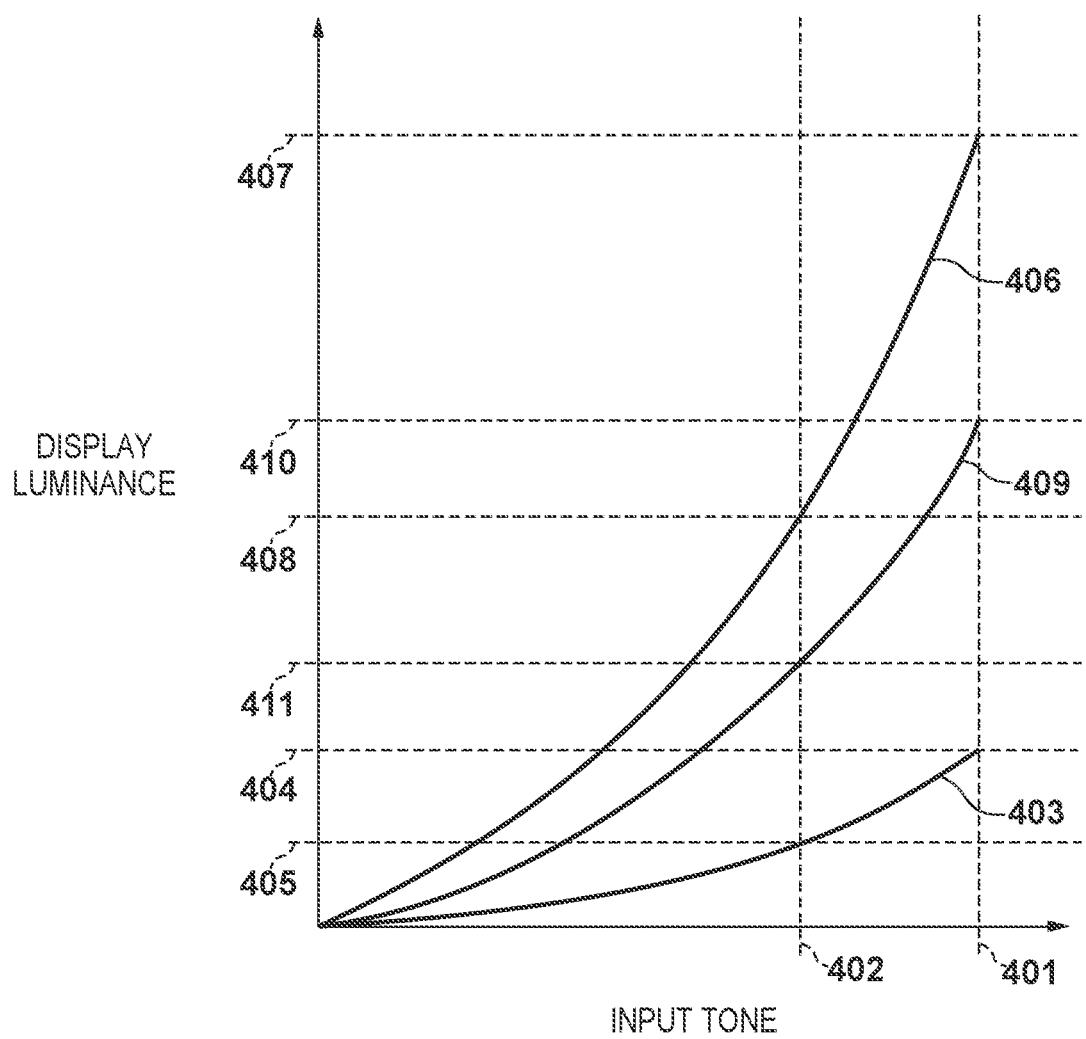
FIG. 4 is a diagram illustrating an example of the tone characteristics of a video signal in the first embodiment.

FIG. 4 is a diagram illustrating an example of the tone characteristics of a video signal in the first embodiment.

A first tone 401 is the maximum tone of the display. A second tone 402 is the maximum tone of the region of interest 604.

A first electro-optical transfer function (EOTF) characteristic 403 is a SDR display characteristic. A first peak luminance 404 is a peak luminance of SDR display time. A first luminance 405 is a luminance of the region of interest 604 of SDR display time.

A second EOTF characteristic 406 is a HDR display characteristic and is a characteristic different to the first EOTF characteristic 403. For example, it is a Hybrid Log-Gamma (HLG) system characteristic. A second peak luminance 407 is a peak luminance of HDR display time. A second luminance 408 is a luminance of the region of interest 604 of HDR display time.

A third EOTF characteristic 409 is a HDR display characteristic based on the region of interest 604 and is a characteristic corresponding to the second EOTF characteristic 406 with its overall luminance compressed according to a change in the peak luminance to maintain a standardized characteristic. A third peak luminance 410 is the peak luminance of HDR display time based on the region of interest 604. A third luminance 411 is a luminance of the region of interest 604 of HDR display time based on the region of interest 604 and is a value greater than the first luminance 405 and less than the second luminance 408, as indicated in equation (1).

Figure 5:
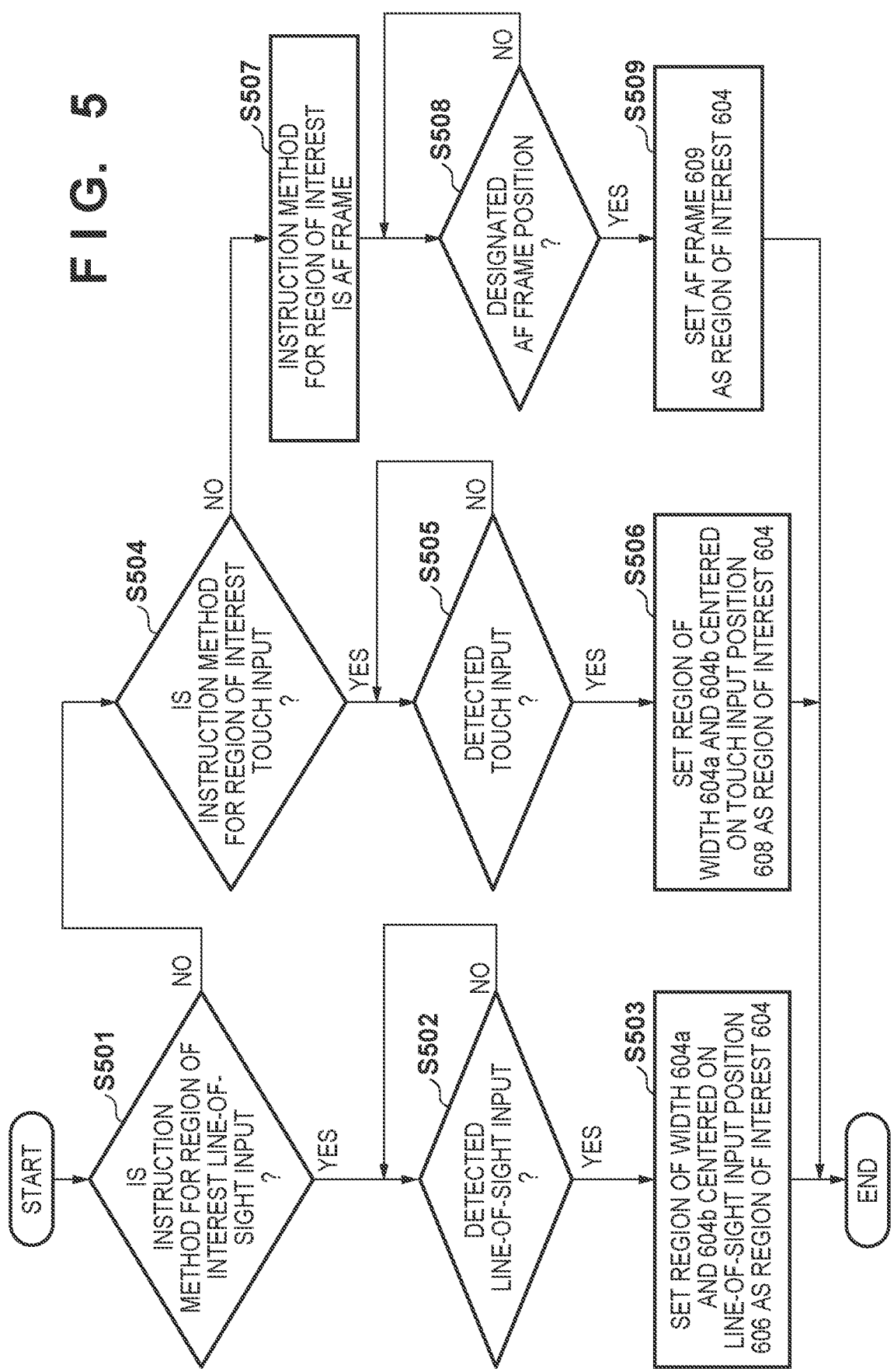
FIG. 5 is a flowchart illustrating the operations of determining the region of interest in the first embodiment.

FIG. 5 is a flowchart illustrating the operations of determining the region of interest of the user in the first embodiment. FIG. 6 is a diagram illustrating an example of the region of interest determination in the first embodiment. Each process of the flowchart of FIG. 5 is implemented by the system control unit 50 deploying a program stored in the non-volatile memory 56 on the system memory 52, executing the program, and controlling the functional blocks. The flowchart of FIG. 5 is executed in step S302 of FIG. 3. The operation of determining the region of interest will now be described with reference to FIGS. 5 and 6.

Figure 6A:
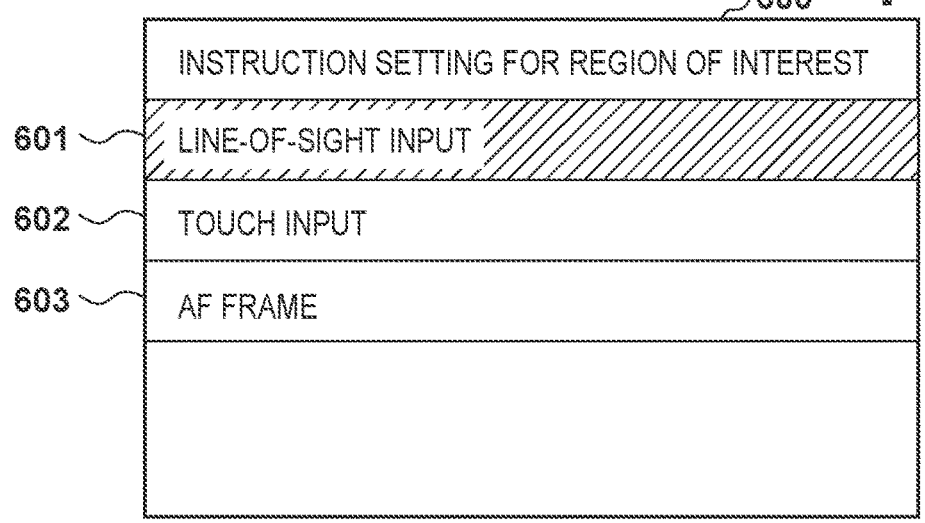
FIGS. 6A-6I are diagrams illustrating an example of the region of interest determination in the first embodiment.

In step S501, the system control unit 50 determines whether or not the instruction method for the region of interest is line-of-sight input, as illustrated in FIG. 6A. In a case where the instruction method is line-of-sight input, the process proceeds to step S502. In a case where the instruction method is not line-of-sight input, the process proceeds to step S504.

In step S502, the system control unit 50 determines whether or not a line-of-sight input has been detected. In a case where a line-of-sight input has been detected, the process proceeds to step S503. In a case where a line-of-sight input has not been detected, step S502 is repeated.

Figure 6B:
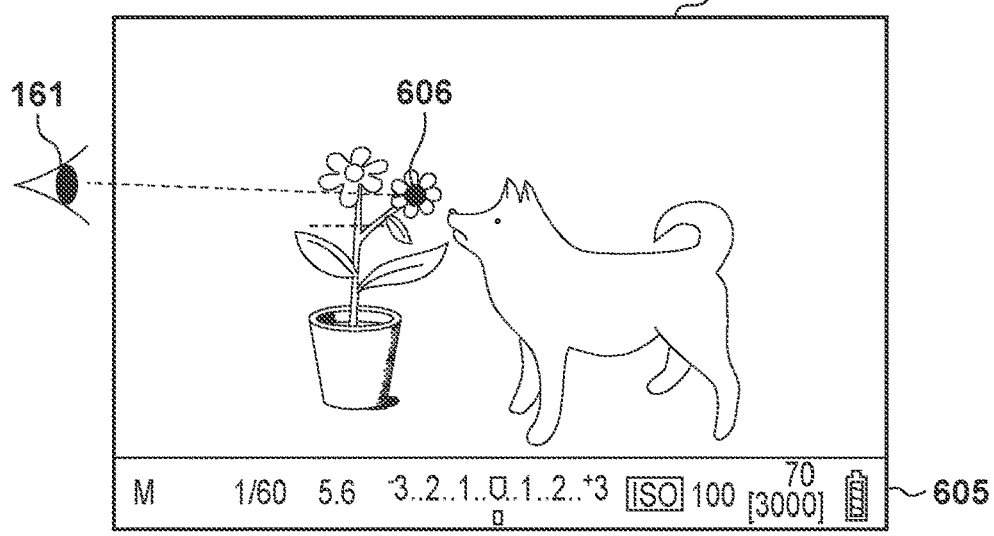
Figure 6C:
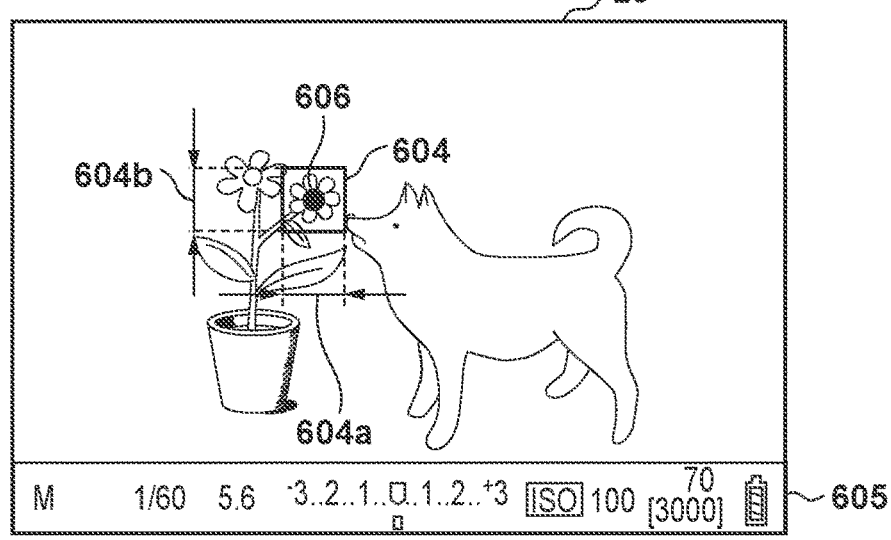

In step S503, the system control unit 50 sets a region of a first width 604a and a second width 604b centered on a line-of-sight input position 606 as the region of interest 604 as illustrated in FIGS. 6B and 6C, and the flow ends.

Figure 6D:
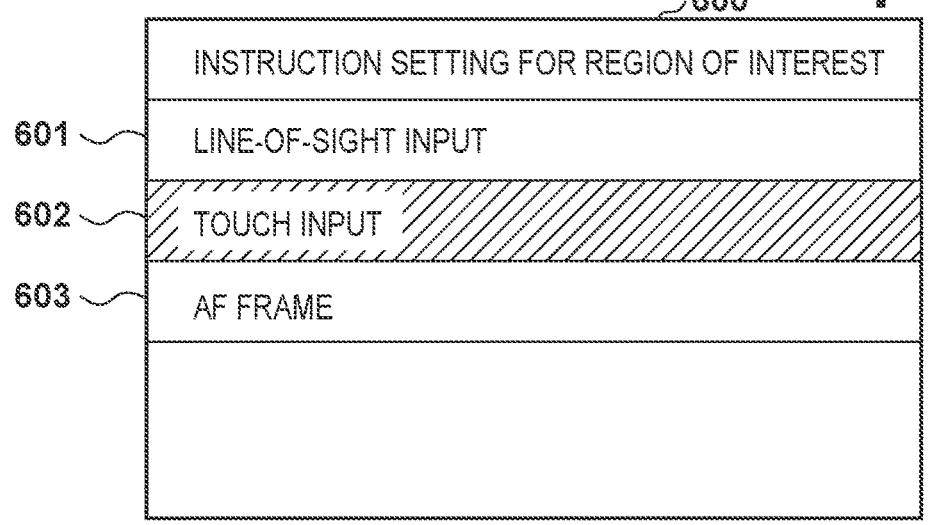

In step S504, the system control unit 50 determines whether or not the instruction method for the region of interest is touch input, as illustrated in FIG. 6D. In a case where the instruction method is touch input, the process proceeds to step S505. In a case where the instruction method is not touch input, the process proceeds to step S507.

In step S505, the system control unit 50 determines whether or not a touch input has been detected. In a case where a touch input has been detected, the process proceeds to step S506. In a case where a touch input has not been detected, step S505 is repeated.

Figure 6E:
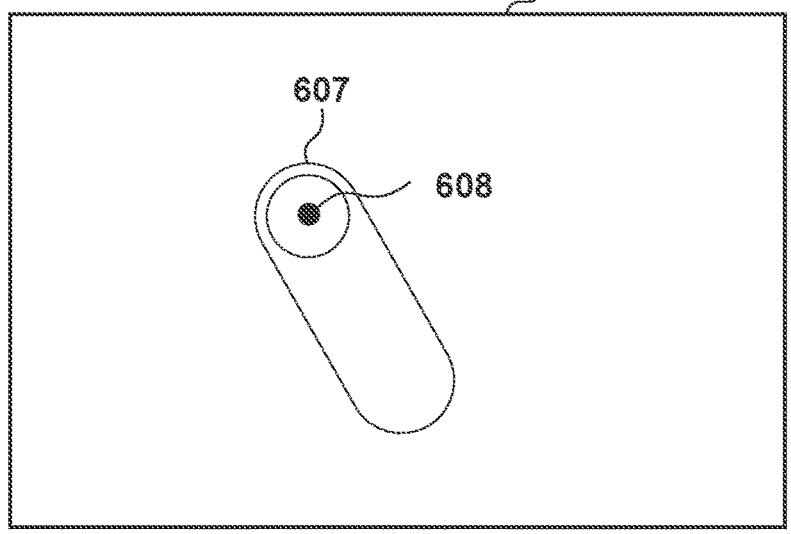
Figure 6F:
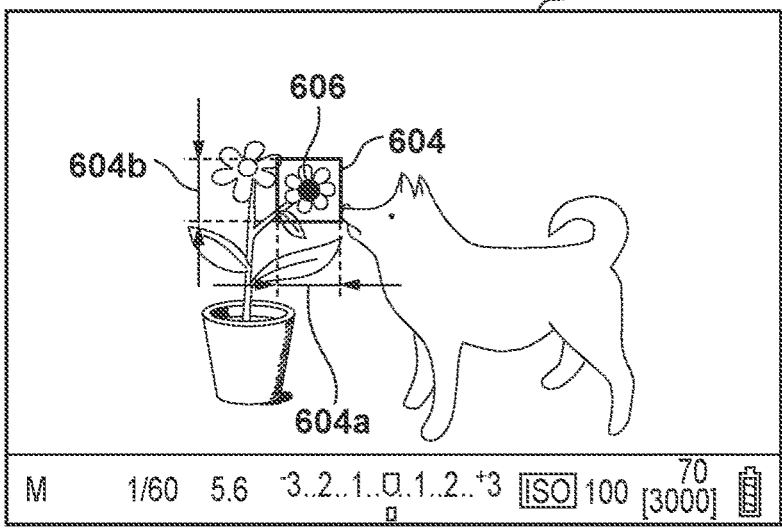

In step S506, the system control unit 50 sets a region of a first width 604a and a second width 604b centered on a touch input position 608 as the region of interest 604 as illustrated in FIGS. 6E and 6F, and the flow ends.

Figure 6G:
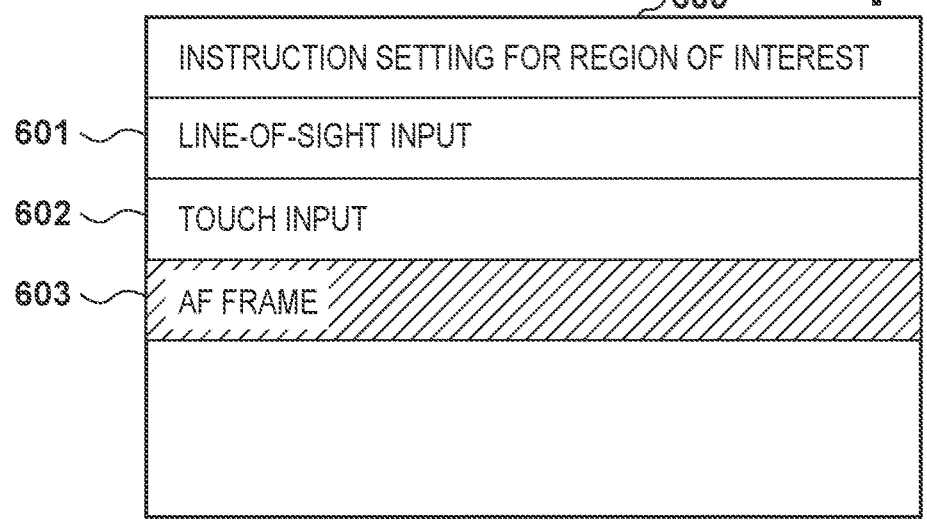

In step S507, the system control unit 50 determines that the instruction method for the region of interest is AF frame as illustrated in FIG. 6G, and the process proceeds to step S508.

In step S508, the system control unit 50 determines whether or not an AF frame position has been designated. In a case where an AF frame position has been designated, the process proceeds to step S509. In a case where an AF frame position has not been designated, step S508 is repeated.

Figure 6H:
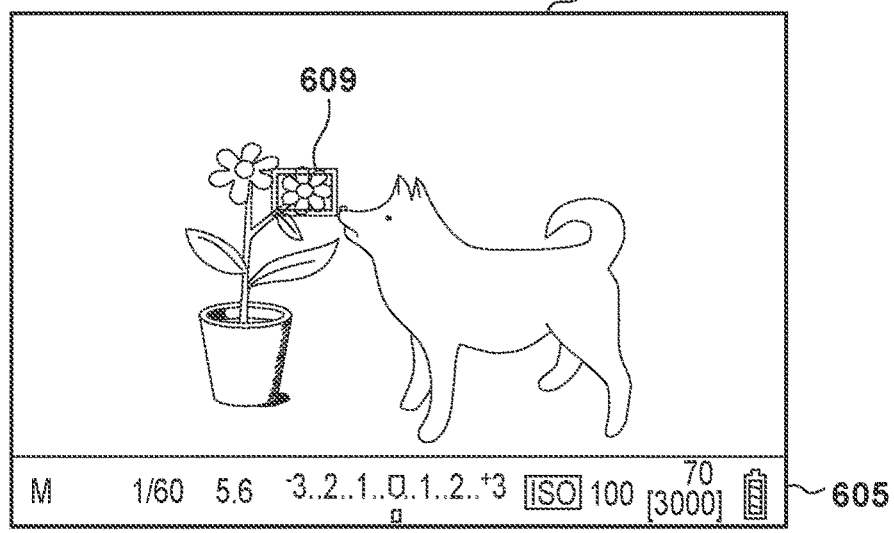
Figure 6I:
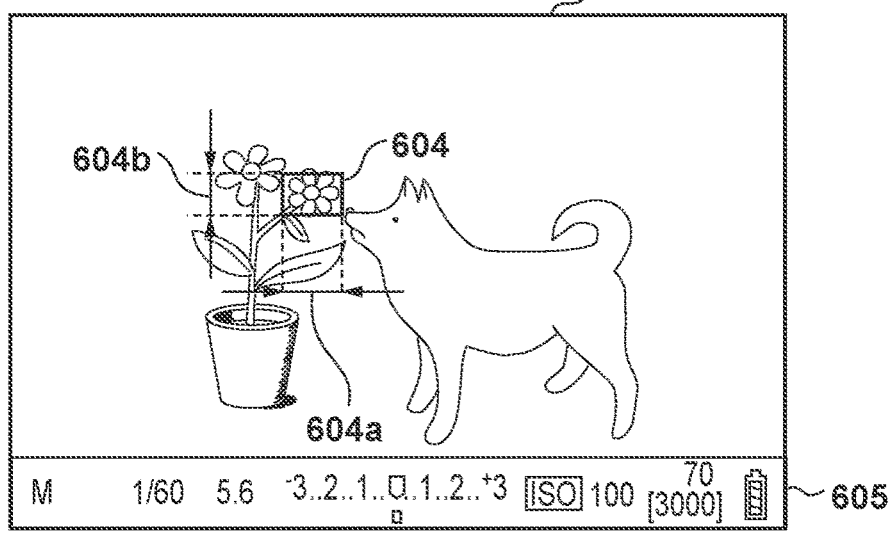

In step S509, as illustrated in FIGS. 6H and 6I, an AF frame 609 is set as the region of interest 604, the flow ends.

FIGS. 6A, 6B, and 6C will now be described in more detail. The region of interest 604 is a region selected on the basis of a user operation and in this embodiment is displayed on the display of the EVF 29. The first width 604a and the second width 604b are widths in the lateral direction and vertical direction, respectively, of the region of interest. A display 600 is a menu display for instruction settings for the region of interest 604. A first setting 601 indicates a setting for instruction via line-of-sight input, a second setting 602 indicates a setting for instruction via touch input, and a third setting 603 indicates a setting for instruction via AF frame. An information display 605 is information displayed on the EVF 29 together with the LV image. For example, the shutter speed, f-number, information relating to image capturing settings such as ISO sensitivity, remaining battery level, and the like are displayed.

FIGS. 6A, 6B, and 6C illustrate the setting state of the display 600, an example of a line-of-sight input on the EVF 29, and an example of the display on the EVF 29 in a case where the region of interest is determined on the basis of line-of-sight input. The position of the region of interest 604 is determined on the basis of the line-of-sight input position 606 from the eyeball (eye) 161. Specifically, this corresponds to the region of the first width 604a and the second width 604b centered on the line-of-sight input position 606.

FIGS. 6D, 6E, and 6F illustrate the setting state of the display 600, an example of a touch input on the touch panel 70a, and an example of the display on the EVF 29 in a case where the region of interest is determined on the basis of touch input. The position of the region of interest 604 is determined on the basis of the touch input position 608 by a finger 607. Specifically, this corresponds to the region of the first width 604a and the second width 604b centered on the touch input position 608. Designating the touch position in an absolute or relative manner is performed in a similar manner.

FIGS. 6G, 6H, and 6I illustrate the setting state of the display 600, an example of an AF frame position on the EVF 29, and an example of the display on the EVF 29 in a case where the region of interest is determined on the basis of AF frame position. The position of the region of interest 604 is determined on the basis of the position of the AF frame 609. Specifically, this corresponds to the same region (with the first width 604a and the second width 604b being the size of the AF frame 609) as the AF frame 609.

FIGS. 7A to 7D are diagrams illustrating examples of switching compositions according to the first embodiment displayed on the display of the EVF 29.

Figure 7A:
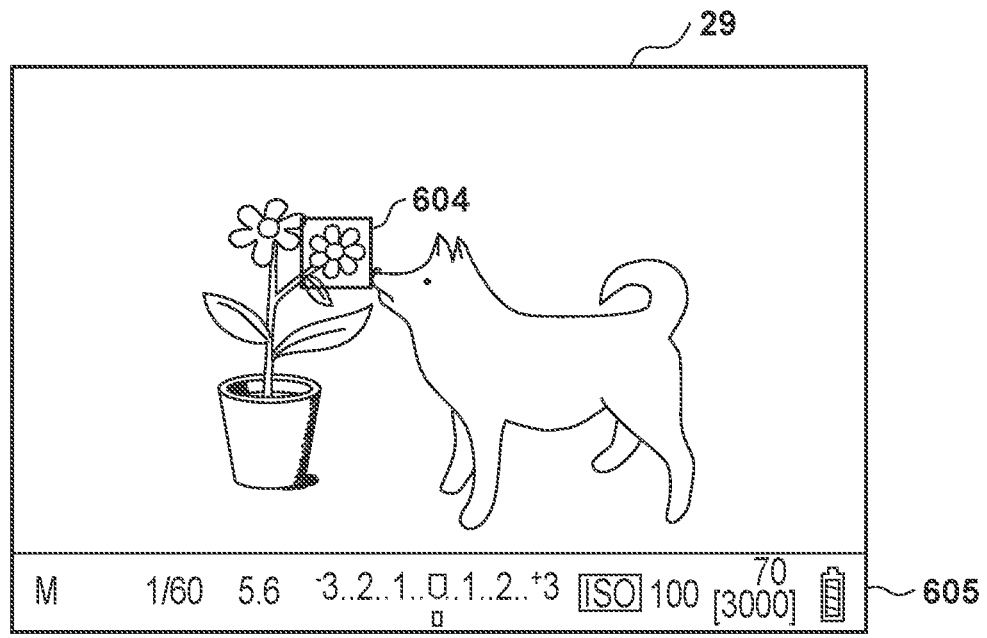
FIGS. 7A to 7D are diagrams illustrating examples of switching compositions according to the first embodiment.
Figure 7B:
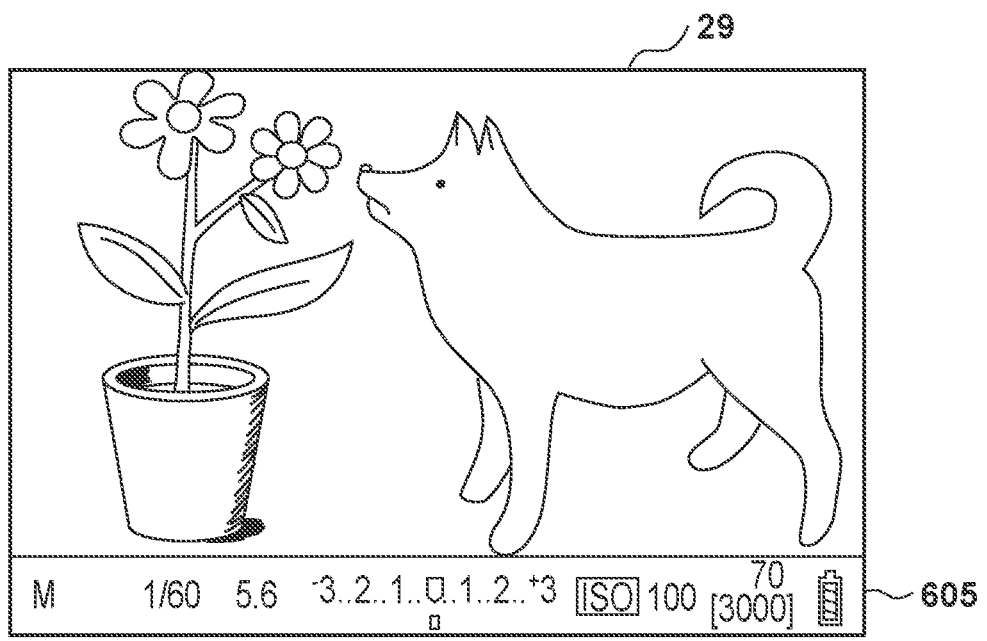

FIG. 7A illustrates an example of a composition before composition switching displayed on the EVF 29. FIG. 7B illustrates an example of a display on the EVF 29 in a case where the display of FIG. 7A is zoomed in and the angle of view is changed. For example, whether or not change has occurred is determined by whether or not there has been an operation of the zoom ring in the lens unit 150.

Figure 7C:
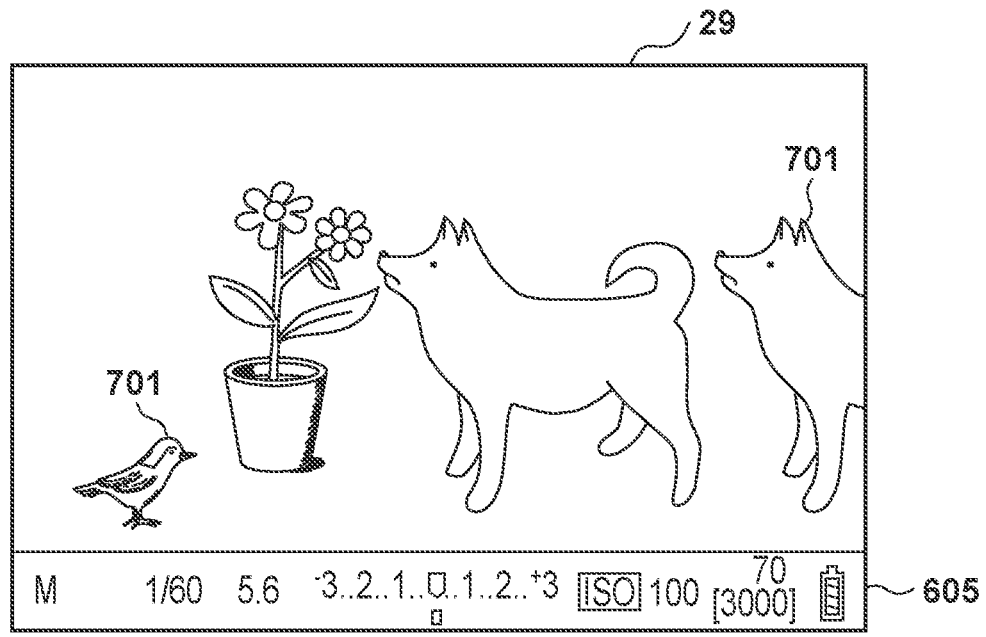

FIG. 7C illustrates an example of a display on the EVF 29 in a case where a subject 701 is newly detected in the display of FIG. 7A. For example, the presence of the subject 701 is determined by the image processing unit 24.

Figure 7D:
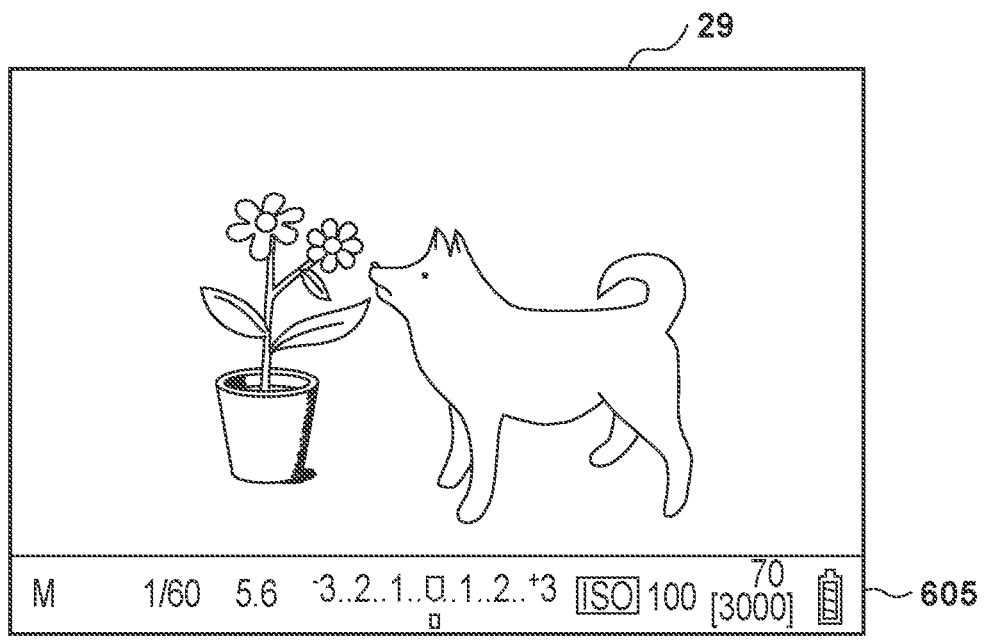

FIG. 7D illustrates an example of a display on the EVF 29 in a case where a main subject in the region of interest 604 is lost in the display of FIG. 7A. For example, the presence of the subject in the region of interest 604 is determined by the image processing unit 24.

In this manner, in the first embodiment, the peak luminance of the display is controlled according to the region of interest. This allows a luminance setting to be implemented that does not impair user visibility. Also, a luminance setting lower than the display luminance set according to the maximum tone as in the related art can be achieved, and a reduction in power consumption can be achieved.

Second Embodiment

An operation of controlling the tone characteristics of a video signal corresponding to the region of interest according to the second embodiment will be described below with reference to FIGS. 8 and 9. The configuration of the digital camera in the second embodiment is the same as the configuration of the digital camera 100 of the first embodiment, and so a description thereof is omitted. The differences from the first embodiment will be described below.

FIG. 8 is a flowchart illustrating the operations of controlling the tone characteristics of a video signal corresponding to the region of interest in the second embodiment. Each process of the flowchart of FIG. 8 is implemented by the system control unit 50 deploying a program stored in the non-volatile memory 56 on the system memory 52, executing the program, and controlling the functional blocks. Note that steps that are the same as the steps in the flowchart of FIG. 3 are given the same symbol, and descriptions thereof are omitted. The flowchart of FIG. 8 starts with the digital camera 100 being activated.

When the digital camera 100 is activated, processing similar to that of step S301 of the flowchart of FIG. 3 is executed.

In step S801, the system control unit 50 corrects the tone characteristic of the video signal on the basis of the determined region of interest 604, and the process proceeds to step S802. This, for example, corresponds to a fourth EOTF characteristic 901 illustrated in FIG. 9.

In step S802, the system control unit 50 performs display with the corrected tone characteristic, and then the process proceeds to step S305.

Figure 9:
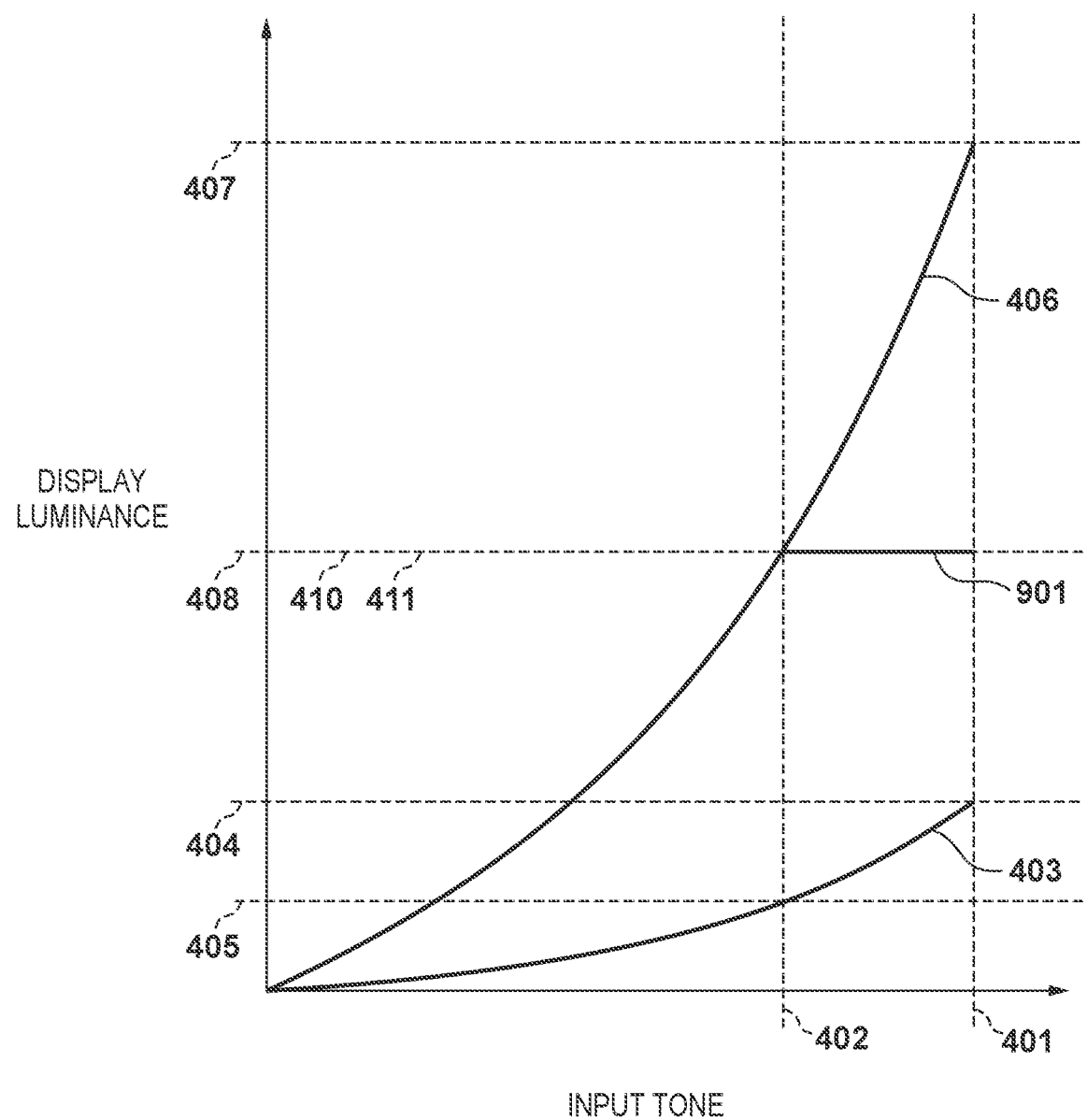
FIG. 9 is a diagram illustrating an example of the tone characteristics of a video signal in the second embodiment.

FIG. 9 is a diagram illustrating an example of the tone characteristics of a video signal in the second embodiment.

The fourth EOTF characteristic 901 is a characteristic for HDR display based on the region of interest 604 and, for example, is a Perceptual Quantization (PQ) system characteristic with the second luminance 408 are the peak luminance.

In this manner, according to the second embodiment, the tone characteristic of the video signal is controlled according to the region of interest. This allows a luminance setting to be implemented that does not impair user visibility. Also, a luminance setting lower than the display luminance set according to the maximum tone as in the related art can be achieved, and a reduction in power consumption can be achieved.

Preferable embodiments of the disclosure have been described above. However, the disclosure is not limited to these embodiments, and various changes and modifications can be made within the scope of the disclosure. Preferred embodiments according to the disclosure have been described above using a digital camera. However, the disclosure is not limited to these specific embodiments and includes various embodiments without departing from the scope of the disclosure. The disclosure can be applied to any electronic device including a display unit. For example, the disclosure may be applied to a display device such as an image viewer. Also, the disclosure may be applied to an audio device such as a music player, for example. Also, the disclosure may be applied to a personal computer, PDA, mobile phone terminal, printer device with a display, digital photo frame, game console, electronic book reader, wearable device with a head mount display, and the like.

Also, in the embodiments described above, the peak luminance La ($cd/m^2$) of the display is calculated using the maximum tone Tmax of the display, the peak luminance Lh ($cd/m^2$) of HDR display time, the peak luminance Ls ($cd/m^2$) of SDR display time, and the maximum tone Ta of the region of interest 604. However, other values may be used. For example, the average tone of the region of interest 604 may be used. Also, in the embodiments described above, the luminance reset condition is the composition being switched or a luminance reset operation being performed using the operation unit 70. However, another condition may be used. For example, no conditions may be set, and luminance reset may be successively performed. Also, in the embodiments described above, the region of interest is determined on the basis of a line-of-sight input, a touch input, or an AF frame. However, another method may be used. Furthermore, in the embodiments described above, the region of interest 604 is specified by the first width 604a and the second width 604b. However, another method of specifying may be used and the shape may be changed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a RAM, a ROM, a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-072922, filed Apr. 15, 2020 which is hereby incorporated by reference herein in its entirety.

What is claimed is:

1. A display control apparatus that controls a display of an image to a display device capable of displaying a high dynamic range image, the display control apparatus comprising:
   at least one processor; and
   at least one memory storing instructions that, when executed by the at least one processor, cause the at least one processor to function as:
   a determination unit configured to determine a region of interest a user is interested in from an image, and
   a control unit configured to, on the basis of a relationship between a value of a maximum tone of display by the display device and a value of a maximum tone of the region of interest, control a display luminance of the display device such that, in a case where the image is displayed on the display device, a peak luminance of display of the region of interest is made equal to or greater than a peak luminance of a standard dynamic range display and equal to or less than a peak luminance of a high dynamic range display.

2. The display control apparatus according to claim 1, wherein the control unit calculates a peak luminance of display of the region of interest on the basis of a ratio of a value of a maximum tone of the region of interest to a value of a maximum tone of display by the display device, a peak luminance of a standard dynamic range display, and a peak luminance of a high dynamic range display.

3. The display control apparatus according to claim 1, wherein the control unit controls a peak luminance of display of the region of interest by correcting a tone characteristic of the image.

4. The display control apparatus according to claim 1, wherein the control unit resets a peak luminance of display of the region of interest in a case where a composition or angle of view of the image is changed.

5. The display control apparatus according to claim 1, wherein the control unit resets a peak luminance of display of the region of interest when a user operation is received.

6. The display control apparatus according to claim 1, wherein the determination unit determines the region of interest by detecting a line-of-sight of a user.

7. The display control apparatus according to claim 1, wherein the determination unit determines the region of interest using a touch panel.

8. The display control apparatus according to claim 1, wherein the determination unit determines the region of interest using an AF frame.

9. The display control apparatus according to claim 1 further comprising a display device.

10. The display control apparatus according to claim 1 further comprising an image capture device configured to capture an image of a subject.

11. A display control method for controlling a display of an image to a display device capable of displaying a high dynamic range image, the method comprising:
   determining a region of interest a user is interested in from an image; and
   on the basis of a relationship between a value of a maximum tone of display by the display device and a value of a maximum tone of the region of interest, controlling a display luminance of the display device such that, in a case where the image is displayed on the display device, a peak luminance of display of the region of interest is made equal to or greater than a peak luminance of a standard dynamic range display and equal to or less than a peak luminance of a high dynamic range display.

12. A non-transitory computer-readable storage medium storing a program for causing a computer to execute the steps of the display control method for controlling a display of an image to a display device capable of displaying a high dynamic range image, the method comprising:
   determining a region of interest a user is interested in from an image; and
   on the basis of a relationship between a value of a maximum tone of display by the display device and a value of a maximum tone of the region of interest, controlling a display luminance of the display device such that, in a case where the image is displayed on the display device, a peak luminance of display of the region of interest is made equal to or greater than a peak luminance of a standard dynamic range display and equal to or less than a peak luminance of a high dynamic range display.

* * * * *